United States Patent Office.

CHASE A. STEVENS, OF NEW YORK, N. Y.

Letters Patent No. 79,701, dated July 7, 1868.

---

IMPROVEMENT IN TREATING ORES, METALS, AND MINERALS.

---

The Schedule referred to in these Letters Patent and making part of the same.

---

TO ALL WHOM IT MAY CONCERN:

Be it known that I, CHASE A. STEVENS, of New York, in the county and State of New York, have invented a new and useful Improvement in Treating Ores, Minerals, and Metals; and I do hereby declare the following to be a full, clear, and exact description thereof, which will enable those skilled in the art to make and use the same.

The object of this invention is to extract and separate the gold, silver, or other metals from the substances combined therewith; also, to treat, reduce, refine, and manufacture iron and its products in all the forms of iron known to metallurgical art.

The auriferous and argentiferous minerals and ores which I propose to treat, I classify in the following manner, each class requiring certain modification in the mode of treatment:

First, quartoze and schistose, being substances where the principal matrices, in which the metals are deposited, are quartz or schists, or compounds of these.

Second, minerals and ores which are principally composed of the first part, but containing, in addition, tellurium and bismuth, which we call telluric and bismuthical.

Third, minerals or ores similar to class one, but consisting chiefly of sulphides, which we call pyritical or sulphurous.

Fourth, minerals or ores similar to class one, but containing considerable portions of arsenic and antimony, or compounds of these which we call arsenical and antimonical.

Fifth, argentiferous galena and copper, chloride of silver, and sulphuret of silver ores.

Sixth, all iron and copper ores containing sulphur, silica, &c.

Seventh, all minerals, clays, or earths.

It is well known to metallurgists, that the presence of silica is a great obstacle in the way of successfully separating metals from their ores in a pure state, and that gold can form chemical combinations not only with oxygen, chlorine, iodine, bromine, and sulphur, but also with silicium, arsenic, bismuth, antimony, zinc, magnesium, and other elementary substances, as well as alloys with silver, platinum, iron, copper, tin, &c. These facts have heretofore caused a loss of from one-fourth to three-fourths of the precious metals which the ore was known to contain, being treated by the process in use.

My invention consists in treating auriferous and argentiferous ores so as to separate and save all the metal contained therein, and other minerals and metals, by the application of the residuum obtained or resulting from the manufacture of soda and other chemicals from the mineral cryolite.

My process of treating ores is by smelting in a crucible or furnace, with the application of said residuum as a flux. The ores are first pulverized to a fine powder, and then thoroughly mixed with the said residuum, so that, as near as possible, every particle of ore shall come in contact with the said residuum; then this mixture, being fed into the furnace slowly, the heat is applied gradually, until the whole mass becomes perfectly liquid. The liquid mass is repeatedly stirred with an iron rake, or until the sulphur or other impure and base material has been separated, expelled, or passed off in gaseous form. It is then allowed to remain quiet, until the metal precipitates to the bottom, when the slag is drawn off, and the furnace is charged with the mixture as before, until the required quantity of one or more tons of ore has been thus treated, the metal being found at the bottom of the furnace.

I am aware that fluxes have been used for "fire assays" and for smelting ores. I am also aware that fluoride of calcium has been used as a flux; but, to the best of my knowledge, the residuum obtained in the manufacture of soda, &c., from the mineral cryolite, which is substantially the fluoride of lime, has not been so used until I invented and discovered the use of it, as herein set forth.

That persons skilled in the arts may be enabled to use my said discovery or invention, I further state that, according to the character of the ores to be treated, I use, in connection with the said residuum, common salt, nitrate of potassa, carbonate of soda, nitrate of soda, peroxide of iron, litharge, galena, lead ore, and other chemicals, for the purpose of assisting the oxidization; but these reagents are used in so small a proportion as not to materially add to the expense of said residuum or flux, which has heretofore been considered waste or useless, and which has been thrown away as an utterly useless substance.

With the first and second classes of ores above mentioned, I use about one ton of flux to three tons of ore; with the third and fourth classes, one ton of flux to five and ten tons of ore, and with the fifth class, one ton of flux to ten tons of ore, and with the sixth and seventh classes, about ten pounds of flux to one ton of ore.

The residuum which I use is produced in the following manner, viz:

The mineral cryolite, which is composed principally of soda, alumina, and fluoric acid, is pulverized and mixed in nearly equal parts with caustic lime, and this mixture is calcined, and the application of heat causes the fluorine to leave the soda and alumina, and combine with the lime, for which it has a greater affinity than it has for the soda, &c., leaving the soda and alumina, which are soluble, to be leached off with the water. The lime being insoluble, retains the fluorine constituting the said residuum, which I use as a flux for treating ores as above set forth.

When the residuum is mixed, in the manner above stated, with the pulverized ore, and subjected to the heat of the smelting-furnaces, the fluorine becomes again active, and combines with and dissolves the silica, making the whole mass nearly as liquid as water, allowing the sulphur, arsenic, and other refractory substances to pass off by oxidation, thereby freeing the precious metals so that they form into globules and precipitate through the liquid mass to the bottom or pot of the furnace in a metallic button or regulus nearly pure. If the metal should not prove perfectly pure, it is refined by cupellation.

In all iron, however pure it may have been made by any process now in use, there still remain various impurities, such as silicium, phosphorus, sulphur, &c. To free the iron from these impurities by the use of the said residuum, the application is made at the time of smelting the iron.

When the iron is charged in the furnace, I cause a mixture of the said flux, with a small portion of common lime, moistened with water, to be sprinkled over the surface of the iron at the rate of about two to three pounds of flux to the ton of iron. During the process of smelting, the flux permeates the melting iron, dissolving the silicium, expelling the sulphur and phosphorus, and burning out the carbon, thereby making a finer crystallization and a more compact fibre to the iron.

When not applied in the furnace, I sprinkle the flux into the ladle as it fills, and use about one pound to one and one-half pound to one ton of iron, producing nearly the same effect as before.

To produce a malleable surface upon cast iron, I cause the casting to be brought to a red heat, and then cover it with the flux, or cause the flux to be rubbed over in such proportion as the size of the casting may require.

In making steel from iron, I use in the smelting-pot about one-half pound to the ton, nearly in the manner above stated.

To make a steel coating upon bolts, hinges, &c., I heat the manufactured articles to a red heat, plunge it into a quantity of finely-pulverized flux, allow it to remain about ten minutes, repeat, and temper it.

To weld steel or steel and iron together, I use three parts of my flux, one part welding-sand, and one part borate of soda, and apply it the same as borax is used in the same operation.

What I claim as new, and desire to secure by Letters Patent, is—

The within-described process of treating auriferous and argentiferous and other ores, clays, earths, and metallic iron, by the application of the residuum obtained from cryolite, substantially in the manner and for the purpose set forth.

CHASE A. STEVENS.

Witnesses:
  S. L. FRENCH,
  THOS. H. BACON.